(12) United States Patent
Goers et al.

(10) Patent No.: US 10,677,739 B2
(45) Date of Patent: Jun. 9, 2020

(54) METHOD AND APPARATUS FOR INSPECTING DEFECTS ON TRANSPARENT SUBSTRATE

(71) Applicant: Corning Incorporated, Corning, NY (US)

(72) Inventors: Uta-Barbara Goers, Campbell, NY (US); En Hong, Painted Post, NY (US); Sung-chan Hwang, Cheonal-si (KR); Ji Hwa Jung, Seoul (KR); Tae-ho Keem, Seongnam-si (KR); Philip Robert LeBlanc, Corning, NY (US); Rajeshkannan Palanisamy, Painted Post, NY (US); Sung-jong Pyo, Asan-si (KR); Correy Robert Ustanik, Davidson, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/346,704

(22) PCT Filed: Oct. 31, 2017

(86) PCT No.: PCT/US2017/059213
§ 371 (c)(1),
(2) Date: May 1, 2019

(87) PCT Pub. No.: WO2018/085233
PCT Pub. Date: May 11, 2018

(65) Prior Publication Data
US 2019/0257765 A1 Aug. 22, 2019

Related U.S. Application Data

(60) Provisional application No. 62/416,291, filed on Nov. 2, 2016.

(51) Int. Cl.
*G01N 21/896* (2006.01)
*G02B 7/182* (2006.01)
(Continued)

(52) U.S. Cl.
CPC ......... *G01N 21/896* (2013.01); *G02B 7/1821* (2013.01); *G02B 21/10* (2013.01);
(Continued)

(58) Field of Classification Search
CPC .. G01N 21/896; G01N 21/898; G01N 21/892; G01N 21/88; G01N 2201/0636; G01N 2021/8967; G02B 7/1821
(Continued)

(56) References Cited

U.S. PATENT DOCUMENTS 5,166,752 A   11/1992  Spanier et al.
6,266,137 B1   7/2001  Morinaga
(Continued)

FOREIGN PATENT DOCUMENTS

JP   2015038423 A   2/2015
WO       0212016 A2   2/2002
(Continued)

OTHER PUBLICATIONS

International Search Report and Written Opinion of the International Searching Authority; PCT/US2017/059213; dated Jan. 4, 2018; 12 Pages; ISA/US Commissioner for Patents.

*Primary Examiner* — Hoa Q Pham

(57) ABSTRACT

A method of inspecting defects of a transparent substrate may include: illuminating a transparent substrate; calculating an incidence angle range of light so that a first region where the light meets a first surface of the transparent substrate and a second region where light meets a second surface being opposite the first surface of the transparent substrate do not overlap each other; adjusting an incidence
(Continued)

angle according to the incidence angle range; adjusting a position of a first detector so that a first field-of-view of the first detector covers the first region and does not cover the second region; adjusting a position of a second detector so that a second field-of-view of the second detector covers the second region and does not cover the first region; and obtaining a first image of the first region and a second image of the second region from the first and second detector, respectively.

14 Claims, 10 Drawing Sheets

(51) Int. Cl.
  *G02B 21/18* (2006.01)
  *G02B 21/10* (2006.01)
(52) U.S. Cl.
  CPC ..... *G02B 21/18* (2013.01); *G01N 2021/8967* (2013.01); *G01N 2201/0636* (2013.01)
(58) Field of Classification Search
  USPC ......... 356/237.1–237.5, 239.1, 239.2, 239.4, 356/239.5, 239.7, 239.8; 348/125; 359/372
  See application file for complete search history.

(56) References Cited

U.S. PATENT DOCUMENTS

| | | | |
|---|---|---|---|
| 6,424,147 B1 | 7/2002 | Kato et al. | |
| 6,603,542 B1 | 8/2003 | Chase et al. | |
| 6,683,695 B1 | 1/2004 | Simpson et al. | |
| 6,906,749 B1 | 6/2005 | Fox | |
| 6,975,410 B1 | 12/2005 | Sturgill | |
| 7,084,967 B2 | 8/2006 | Nikoonahad et al. | |
| 7,098,055 B2 | 8/2006 | Noguchi et al. | |
| 7,557,913 B2 | 7/2009 | Otani et al. | |
| 7,567,344 B2 | 7/2009 | LeBlanc et al. | |
| 7,714,996 B2 | 5/2010 | Yan et al. | |
| 8,040,502 B2 | 10/2011 | Thomas et al. | |
| 8,482,728 B2 | 7/2013 | Uto et al. | |
| 8,711,346 B2 | 4/2014 | Stokowski | |
| 2009/0059215 A1 | 3/2009 | Mehanian et al. | |
| 2009/0251690 A1 | 10/2009 | Otani et al. | |
| 2010/0325761 A1 | 12/2010 | Nakata et al. | |
| 2011/0019197 A1 | 1/2011 | Meeks | |
| 2011/0310244 A1 | 12/2011 | Schweitzer et al. | |
| 2012/0044344 A1* | 2/2012 | Zheng ................. | G01N 21/896 348/93 |
| 2012/0133762 A1* | 5/2012 | Schweitzer .......... | G01N 21/896 348/92 |
| 2012/0224163 A1 | 9/2012 | Kawanami | |
| 2014/0268105 A1 | 9/2014 | Bills et al. | |
| 2014/0307080 A1 | 10/2014 | Kim et al. | |
| 2014/0347664 A1 | 11/2014 | Schrader et al. | |
| 2015/0041666 A1 | 2/2015 | Chuang et al. | |
| 2019/0277774 A1* | 9/2019 | An ....................... | G01N 21/896 |

FOREIGN PATENT DOCUMENTS

| | | |
|---|---|---|
| WO | 2006108137 A2 | 10/2006 |
| WO | 2017204560 A1 | 11/2017 |

* cited by examiner

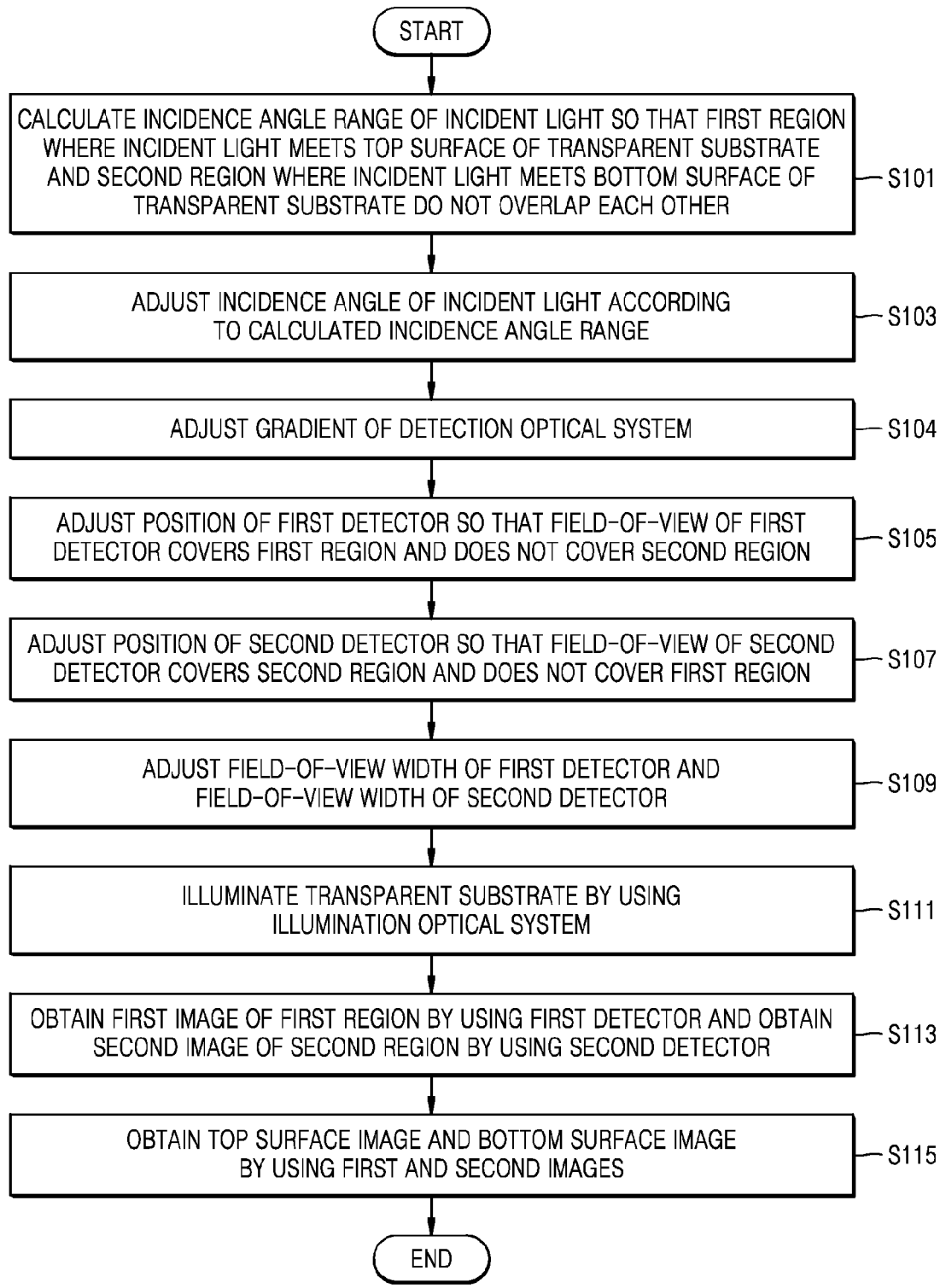

| DEFECT | POSITION COMPONENT | LIGHT INTENSITY |
|---|---|---|
| D1 | P1(X1,Y1) | I1 |
| D2 | P2(X2,Y2) | I2 |
| D3 | P3(X3,Y3) | I3 |

| DEFECT | POSITION COMPONENT | LIGHT INTENSITY |
|---|---|---|
| D4 | P1(X1,Y1) | I4 |
| D5 | P2(X2,Y2) | I5 |
| D6 | P4(X4,Y4) | I6 |

METHOD AND APPARATUS FOR INSPECTING DEFECTS ON TRANSPARENT SUBSTRATE

This is a national stage application under 35 U.S.C. § 371 of International Application No. PCT/US2017/059213, filed on Oct. 31, 2017, which claims the benefit of priority under U.S.C. § 119 of U.S. Provisional Application Ser. No. 62/416,291, filed on Nov. 2, 2016, the content of which is relied upon and incorporated herein by reference in its entirety.

BACKGROUND

Field

One or more embodiments disclosed herein relate to a method and apparatus for discriminating and inspecting defects on a first surface of a transparent substrate and defects on a second surface being opposite to the first surface of the transparent substrate.

Description of the Related Art

Defects on a transparent substrate may be inspected by using an optical method involving emitting light to an object to be inspected and detecting light reflected and scattered from the object to be inspected. In this case, since the emitted light is transmitted through the transparent substrate, not only defects on a first surface (i.e., the surface upon which the light is first incident) of the object to be inspected but also defects on a second surface being opposite to the first surface or between the first and second surfaces of the object to be inspected, i.e., within the object, may be detected.

There is ever increasing demand for a transparent substrate to have minimal surface defects. There is also a need for improved technology for rapidly and accurately discriminating and detecting defects on a first surface of the transparent substrate and defects on a second surface of the transparent substrate.

SUMMARY

One or more embodiments include a method and apparatus for rapidly and accurately detecting nanoscale defects (i.e., defects of about hundreds of nanometers or less) by discriminating defects on a first surface of a transparent substrate and defects on a second surface of the transparent substrate.

Additional aspects will be set forth in part in the description which follows and, in part, will be apparent from the description, or may be learned by practice of the presented embodiments.

According to one or more embodiments, a method of inspecting defects of a transparent substrate, the method including: illuminating the transparent substrate by emitting light from an illumination optical system; calculating an incidence angle range of light emitted from the illumination optical system and incident on the transparent substrate so that a first region where the light meets a first surface of the transparent substrate and a second region where light transmitted through the transparent substrate meets a second surface of the transparent substrate do not overlap each other in a direction normal to the transparent substrate; adjusting an incidence angle of the light according to the calculated incidence angle range; adjusting a position of a first detector so that a first field-of-view of the first detector covers the first region and does not cover the second region; adjusting a position of a second detector so that a second field-of-view of the second detector covers the second region and does not cover the first region; and obtaining a first image of the first region from the first detector and obtaining a second image of the second region from the second detector.

The calculating the incidence angle range may comprise determining a horizontal separation distance between opposite edges of the first region and the second region.

The incidence angle range may be calculated according to the following equation:

$$D_{R1R2} = T \cdot \tan\left(\sin^{-1}\left(\frac{\sin\theta_1}{n}\right)\right) - \frac{W_L}{\cos\theta_1} \geq 0$$

where $D_{R1R2}$ is a separation distance between the first region and the second region, T is a thickness of the transparent substrate, $\theta_1$ is the incidence angle, n is a refractive index of the transparent substrate, and $W_L$ is a beam width of the incident light.

The method may further include adjusting a field-of-view width of the first detector and a field-of-view width of the second detector so that the first field-of-view and the second field-of-view do not overlap each other.

The method may further include adjusting at least one of a beam width of the illumination optical system and field-of-view widths of the first and second detectors so that the widths of the first field-of-view and the first region are matched to each other and the widths of the second field-of-view and the second region are matched to each other.

The method may further include moving the transparent substrate mounted on a stage, wherein the illuminating of the transparent substrate and the obtaining of the first and second images are simultaneously performed while the transparent substrate is moved.

After the obtaining of the first and second images, the method may further include obtaining a first surface image and a second surface image by using the first and second images.

The method may further include: extracting a first position component of defects detected on the first image and a second position component of defects detected on the second image; generating defect position data including the first and second position components; comparing a light intensity of each position component of the defect position data on the first image with a light intensity of each position component of the defect position data on the second image; and obtaining the first surface image of the transparent substrate by removing, from the first image, defects on positions with a greater light intensity on the second image than a light intensity on the first image.

The method may further include obtaining the second surface image of the transparent substrate by removing, from the second image, defects on defect positions with a greater light intensity on the first image than a light intensity on the second image.

After the adjusting of the incidence angle of the incident light, the method may further include adjusting a gradient of a detection optical system including the first detector and the second detector so that each of optical axes of the first and second detectors has a detection angle that is equal to or less than the incidence angle.

A position of at least one of the first and second detectors may be adjusted according to the following equation:

$$D_{R1R2} \geq D_{F1F2} \geq 0$$

where $D_{F1F2}$ is a separation distance between the first field-of-view and the second field-of-view, $D_{R1R2}$, is a separation distance between the first region and a 2'nd region, the 2'nd region is a region through which the second region is exposed to the first surface of the transparent substrate when the second region is seen at the detection angle, and $D_{R1R2}$ is determined by the following equation:

$$D_{R1R2'} = T \cdot \tan\left(\sin^{-1}\left(\frac{\sin\theta_1}{n}\right)\right) - \frac{W_L}{\cos\theta_1} + T \cdot \tan\left(\sin^{-1}\left(\frac{\sin\theta_2}{n}\right)\right)$$

where T is a thickness of the transparent substrate, $\theta_1$ is the incidence angle, $\theta_2$ is the detection angle, n is a refractive index of the transparent substrate, and $W_L$ is a beam width of the incident light.

According to one or more embodiments, an apparatus for inspecting defects of a transparent substrate includes: an illumination optical system configured to emit light on the transparent substrate; a controller configured to calculate an incidence angle range of the incident light so that a first region where the incident light meets a first surface of the transparent substrate and a second region where light transmitted through the transparent substrate meets a second surface of the transparent substrate do not overlap each other in a direction normal to the transparent substrate, the second surface being opposite to the first surface; and a detection optical system configured to have an optical axis that is aligned to have a direction normal to the transparent substrate, and including a first detector having a first field-of-view and a second detector having a second field-of-view, wherein the first field-of-view covers the first region and does not cover the second region and the second field-of-view covers the second region and does not cover the first region.

The controller may calculate a position range of each of the first and second detectors.

The detection optical system may include an imaging lens and a beam splitter sequentially arranged from the first surface of the transparent substrate, wherein the first and second detectors are perpendicular to each other so that the first and second detectors respectively face portions of light reflected from and transmitted through the beam splitter.

The apparatus may further include an angle adjusting member configured to adjust a gradient of the detection optical system.

Each of the first and second detectors may include an image sensor using time delay and integration.

According to one or more embodiments, an apparatus for inspecting defects of a transparent substrate includes: a light source located over the transparent substrate; a mirror configured to adjust an incidence angle of light emitted from the light source; a controller configured to control the mirror to be rotated so that a first region where the light meets a first surface of the transparent substrate and a second region where light, transmitted through the transparent substrate meets a second surface of the transparent substrate do not overlap each other in a direction normal to the transparent substrate, the second surface being opposite to the first surface; a first detector located over the transparent substrate so that a first field-of-view of the first detector covers the first region and does not cover the second region; and a second detector located over the transparent substrate so that a second field-of-view of the second detector covers the second region and does not cover the first region.

The light source may be configured to have an optical axis that is aligned with a direction normal direction of the transparent substrate.

The first and second detectors may be configured relative to the first surface of the transparent substrate so as have optical axes that are aligned with a direction normal to the transparent substrate.

The controller may control the mirror to be rotated based on a horizontal distance between opposite edges of the first region and the second region.

BRIEF DESCRIPTION OF THE DRAWINGS

These and/or other aspects will become apparent and more readily appreciated from the following description of the embodiments, taken in conjunction with the accompanying drawings in which:

FIG. 2 is a flowchart of a method of detecting defects of the transparent substrate, according to an embodiment;

DETAILED DESCRIPTION

Figure 1A:
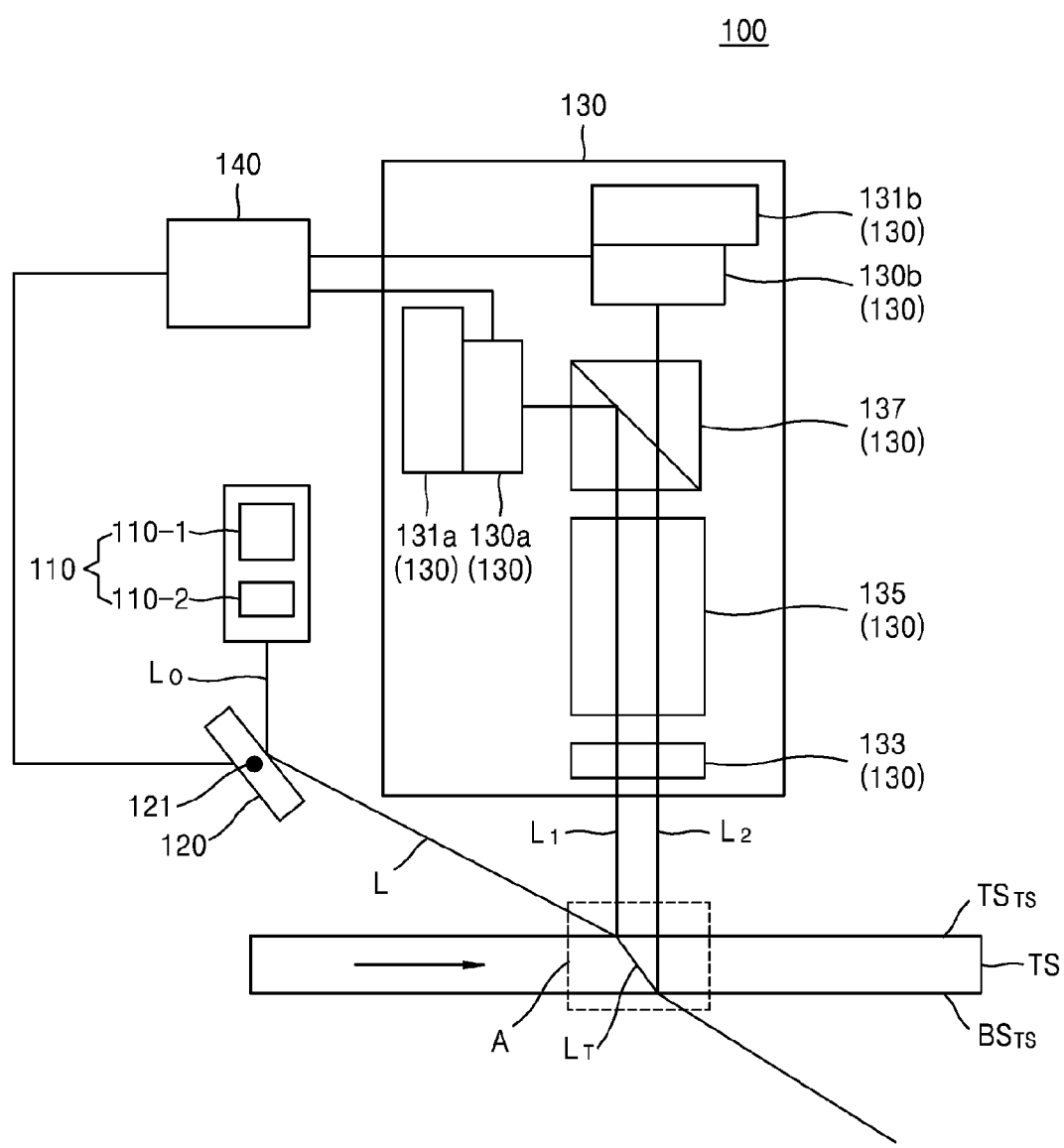
FIG. 1A is a view of an apparatus for inspecting defects of a transparent substrate, according to an embodiment.

Embodiments herein will be described more fully with reference to the accompanying drawings, in which various embodiments are shown and the same reference numerals denote the same or like parts. It will be understood that, although the terms first, second, etc. may be used herein to describe various components, these components should not be limited by these terms. These terms are only used to distinguish one component from another component.

The terms used in the present disclosure are used to describe embodiments, and an expression used in the singular encompasses the expression of the plural, unless it has a clearly different meaning in the context. In the present disclosure, it is to be understood that the terms such as "including", "having", and "comprising" are intended to indicate the existence of features, numbers, steps, actions, components, parts, or combinations thereof disclosed in the disclosure, and are not intended to preclude the possibility that one or more other features, numbers, steps, actions, components, parts, or combinations thereof may exist or may be added.

All terms including technical and scientific terms used herein have meanings which can be generally understood by one of ordinary skill in the art, if the terms are not particularly defined. General terms defined by dictionaries should be understood to have meanings which can be contextually understood in the art and should not have ideally or excessively formal meanings, if the terms are not defined particularly herein.

When a certain embodiment may be implemented differently, a specific process order may be different from the described order. For example, two consecutively described processes may be performed substantially at the same time or performed in an order opposite to the described order.

Variations from the shapes of the illustrations as a result, for example, of manufacturing techniques and/or tolerances, are to be expected. Thus, embodiments should not be construed as limited to the particular shapes of regions illustrated herein but may be to include deviations in shapes that result, for example, from manufacturing. As used herein, the term "and/or" includes any and all combinations of one or more of the associated listed items.

As used herein, the term "and/or" includes any and all combinations of one or more of the associated listed items. Expressions such as "at least one of" when preceding a list of elements, modify the entire list of elements and do not modify the individual elements of the list.

Figure 1B:
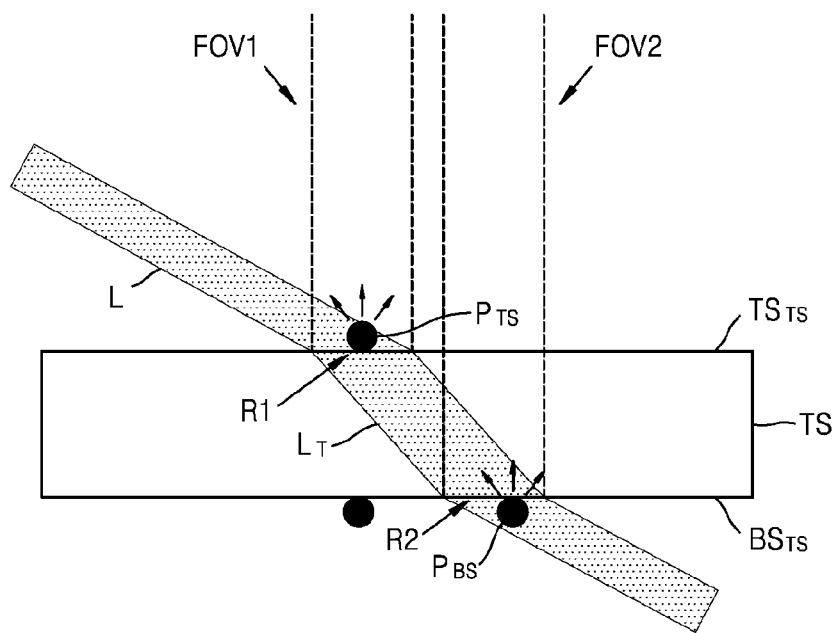
FIG. 1B is an enlarged view of a portion A of FIG. 1A, illustrating incident light and transmitted light of the transparent substrate.

FIG. 1A is a view of an apparatus 100 for inspecting defects of a transparent substrate TS, according to an embodiment. FIG. 1B is an enlarged view of a portion A of FIG. 1A, illustrating incident light L and transmitted light $L_T$ of the transparent substrate TS.

Referring to FIGS. 1A and 1B, the apparatus 100 for detecting defects of the transparent substrate TS may include an illumination optical system 110, a mirror 120, a detection optical system 130 including first and second detectors 130a and 130b, and a controller 140.

An object to be inspected by the apparatus 100 is the transparent substrate TS. The transparent substrate TS may include a first surface $TS_{TS}$ on which light is incident and a second surface $BS_{TS}$ being opposite to the first surface $TS_{TS}$. In this case, the transparent substrate TS may be a glass substrate used in a display device such as a liquid crystal display, organic light emitting diode (OLED) display, quantum dots (QD) display and so on. Particles $P_{TS}$ and $P_{BS}$ that are foreign materials may respectively exist on the first surface $TS_{TS}$ and the second surface $BS_{TS}$. The particles $P_{TS}$ and $P_{BS}$ may cause defects on the transparent substrate TS in a subsequent process using the transparent substrate TS. Accordingly, it is necessary to precisely monitor the particles $P_{TS}$ having a size of about hundreds of nanometers or less on the first surface $TS_{TS}$ of the transparent substrate TS. It is also necessary to monitor the particles $P_{BS}$ having a predetermined size or more or defects such as flaws occurring during transport on the second surface $BS_{TS}$. The transparent substrate TS is illustrated to have a thickness that is exaggerated compared to a thickness (e.g., several millimeters to several micrometers) of an actual transparent substrate.

The illumination optical system 110 may be located over the transparent substrate TS to have an optical axis that is aligned with a direction normal to the transparent substrate TS. The illumination optical system 110 may include a light source 110-1 and a focusing lens 110-2. The focusing lens 110-2 is located in a path of light that is generated from the light source 110-1.

Examples of the light source 110-1 may include a light-emitting device, an illumination device, a lamp, and a beam former. The incident light L may be a ray of light or a laser beam. The light source 110-1 may, for example, generate blue light. In an embodiment, the light source 110-1 may generate light with a wavelength band ranging from about 400 nm to about 500 nm.

The focusing lens 110-2 may focus light generated from the light source 110-1 on an emission region of the transparent substrate TS. That is, the focusing lens 110-3 may adjust a size of the emission region of the transparent substrate TS.

The mirror 120 may be located in a path of light $L_0$ emitted from the illumination optical system 110 so that the incident light L is emitted to the first surface $TS_{TS}$ of the transparent substrate TS. An incidence angle $\theta_1$ of the incident light L may be adjusted by the mirror 120 that is located in the path of the light $L_0$. Accordingly, the incident light L may be emitted to the first surface $TS_{TS}$ of the transparent substrate TS at the incidence angle $\theta_1$ that is relatively large.

The mirror 120 may be electrically connected to the controller 140 and may be rotated based on a control signal from the controller 140. The mirror 120 may be rotated about a rotation axis 121 clockwise or counterclockwise. To this end, the mirror 120 may include a driving mechanism and a power transmission mechanism. Examples of the driving mechanism may include a driving motor and an electric motor. Examples of the power transmission mechanism may include a pulley and a belt, a sprocket and a chain, and a driving gear and a driven gear. Examples of the mirror 120 may include a reflecting mirror, a reflection device, and a reflector.

The controller 140 may calculate the incidence angle $\theta_1$ of the incident light L and may control the mirror 120 to be rotated based on the calculated incidence angle $\theta_1$. In detail, the controller 130 may calculate the incidence angle $\theta_1$ of the incident light L so that when the transparent substrate TS is viewed from above, a first region where the incident light L meets the first surface $TS_{TS}$ of the transparent substrate TS and a second region where the transmitted light $L_T$, from among the incident light L, transmitted through the transparent substrate TS meets the second surface $BS_{TS}$ of the transparent substrate TS do not overlap each other, which will be explained below in detail with reference to FIGS. 2 and 3.

Also, the controller 140 may calculate position ranges of the first and second detectors 130a and 130b. That is, the controller 140 may calculate a position range of the first detector 130a so that a first field-of-view FOV1 of the first detector 130a covers the first region and does not cover the second region. Likewise, the controller 140 may calculate a position range of the second detector 130b so that a second field-of-view FOV2 of the second detector 130b covers the second region and does not cover the first region.

Also, the controller 140 may be configured to analyze images obtained by the first and second detectors 130a and 130b, determine whether detected particles exist on the first surface $TS_{TS}$ or the second surface $BS_{TS}$ of the transparent substrate TS, and obtain a first surface image and a second surface image of the transparent substrate TS.

In some embodiments, the controller 140 may include a computer including a program storage unit. A program or arbitrary programs for calculating a position range of at least one of the illumination optical system 110, the transparent substrate TS, and the detection optical system 130 and analyzing images may be stored in the program storage unit. Examples of the program storage unit may include a computer-readable hard disk, a flexible disk, a compact disk, a magneto-optical disk, and a memory card.

The detection optical system 130 may be located over the transparent substrate TS to have an optical axis that is perpendicular to the first surface $TS_{TS}$ of the transparent substrate TS. The detection optical system 130 may include a filter 133, an imaging lens 135, a beam splitter 137, the first and second detectors 130a and 130b, and first and second position adjusting members 131a and 131b respectively connected to the first and second detectors 130a and 130b. The first and second detectors 130a and 130b may be perpendicular to each other so that the first and second detectors 130a and 130b respectively face pieces of light reflected from and transmitted through the beam splitter 137.

Each of the first and second detectors 130a and 130b may be located to have an optical axis that is perpendicular to the first surface $TS_{TS}$ of the transparent substrate TS. Accordingly, the first and second detectors 130a and 130b may extend downward to be perpendicular to the transparent substrate TS to form the first and second field-of-views FOV1 and FOV2 on the transparent substrate TS. In this case, positions of the first and second detectors 130a and 130b may be adjusted according to the position ranges calculated by the controller 140. Accordingly, the first detector 130a may be located so that the first field-of-view FOV1 covers the first region and does not to cover the second region. Likewise, the second detector 130b may be located so that the second field-of-view FOV2 covers the second region and does not to cover the first region.

Accordingly, the first detector 130a may minimize light scattered from the particles $P_{BS}$ on the second surface $BS_{TS}$ of the transparent substrate TS and may detect light scattered from the particles $P_{TS}$ on the first surface $TS_{TS}$ of the transparent substrate TS. Likewise, the second detector 130b may minimize light scattered from the particles $P_{TS}$ on the first surface $TS_{TS}$ of the transparent substrate TS and may detect light scattered from the particles $P_{BS}$ on the second surface $BS_{TS}$ of the transparent substrate TS. That is, the first and second detectors 130a and 130b may discriminate and detect the particles $P_{TS}$ on the first surface $TS_{TS}$ of the transparent substrate TS and the particles $P_{BS}$ on the second surface $BS_{TS}$ of the transparent substrate TS, which will be explained below in detail with reference to FIGS. 2 and 3.

Images obtained by the first and second detectors 130a and 130b may be transmitted as electrical signals to the controller 140. In an embodiment, each of the first and second detectors 130a and 130b may be an image sensor using time delay and integration (TDI) (referred to as the TDI CMOS image sensor). The TDI CMOS image sensor may detect the particles $P_{TS}$ on the transparent substrate TS with high precision while the transparent substrate TS mounted on a stage is moved. Also, since the TDI CMOS image sensor has a high sensitivity to blue light with a wavelength band ranging from about 400 nm to about 500 nm, the TDI CMOS image sensor may show high detection efficiency even when particles are tiny and a scattering intensity is low. Examples of the image sensor may include a CMOS camera and a line charge-coupled device (CCD) camera. Examples of each of the first and second detectors 130a and 130b may include a photographing device, an imaging device, a detection device, and a detector.

The first and second position adjusting members 131a and 131b may be respectively connected to the first and second detectors 130a and 130b and may respectively adjust positions of the first and second detectors 130a and 130b. The first and second position adjusting members 131a and 131b may adjust positions of the first and second detectors 130a and 130b based on the position ranges calculated by the controller 140.

The filter 133 may be located at a front end of the imaging lens 135 in order to remove light with a wavelength band other than a target wavelength band or background noise introduced into the first and second detectors 130a and 130b. The imaging lens 135 may adjust ranges of the first and second field-of-views FOV1 and FOV2 of the first and second detectors 130a and 130b. The beam splitter 137 is provided so that the first and second detectors 130a and 130b separate pieces of light L1 and L2 scattered from the transparent substrate TS. In this case, when the imaging lens 135 is a high magnification lens, the beam splitter 137 may be located at a rear end of the imaging lens 135 far from the first surface $TS_{TS}$ of the transparent substrate TS.

The transparent substrate TS may be horizontally or vertically moved by the stage. In some embodiments, the stage may include an air bearing assembly. The air bearing assembly can be configured to minimize contact with the transparent substrate TS, and thus may protect the transparent substrate TS in a process of inspecting defects.

Since the illumination optical system 110 and the detection optical system 130 are located to be perpendicular to the normal direction of the transparent substrate TS, the apparatus 100 may be made compact and may have high mechanical strength. However, the disclosure is not limited thereto, and the illumination optical system 110 and the detection optical system 130 may be inclined at different angles from the normal direction of the transparent substrate TS, which will be explained below in detail with reference to FIGS. 5A and 5B.

Figure 3:
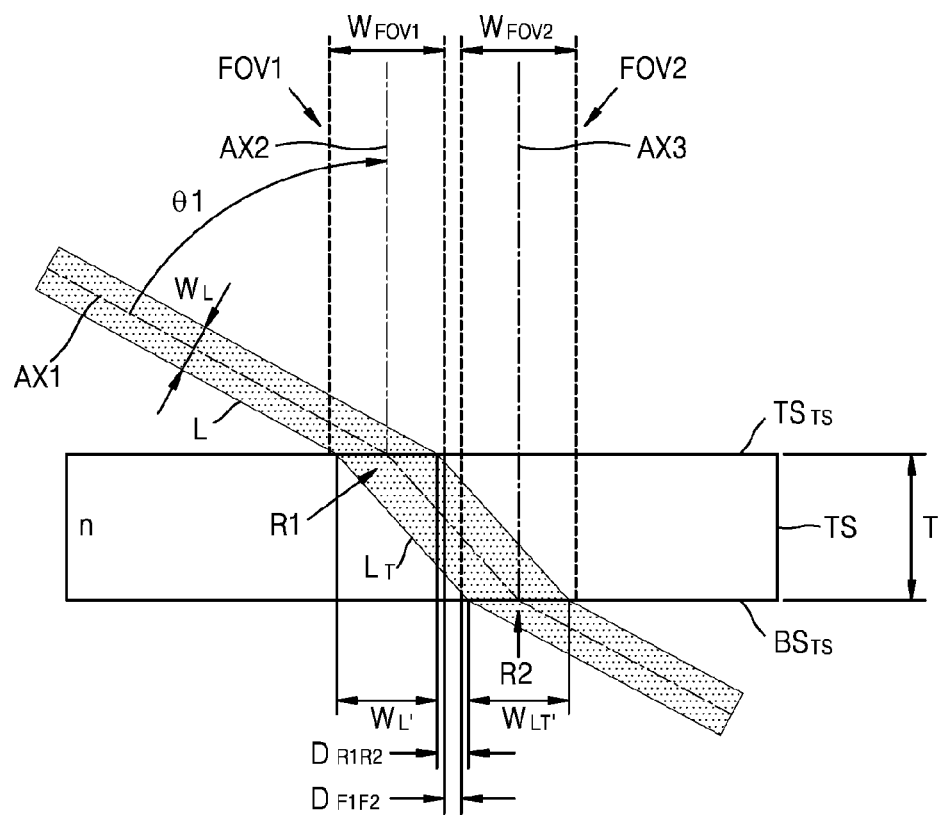
FIG. 3 is an enlarged view of the portion A of FIG. 1A, for explaining an operation of selecting a gradient of an illumination optical system and an operation of adjusting positions of first and second detectors.
Figure 4A:
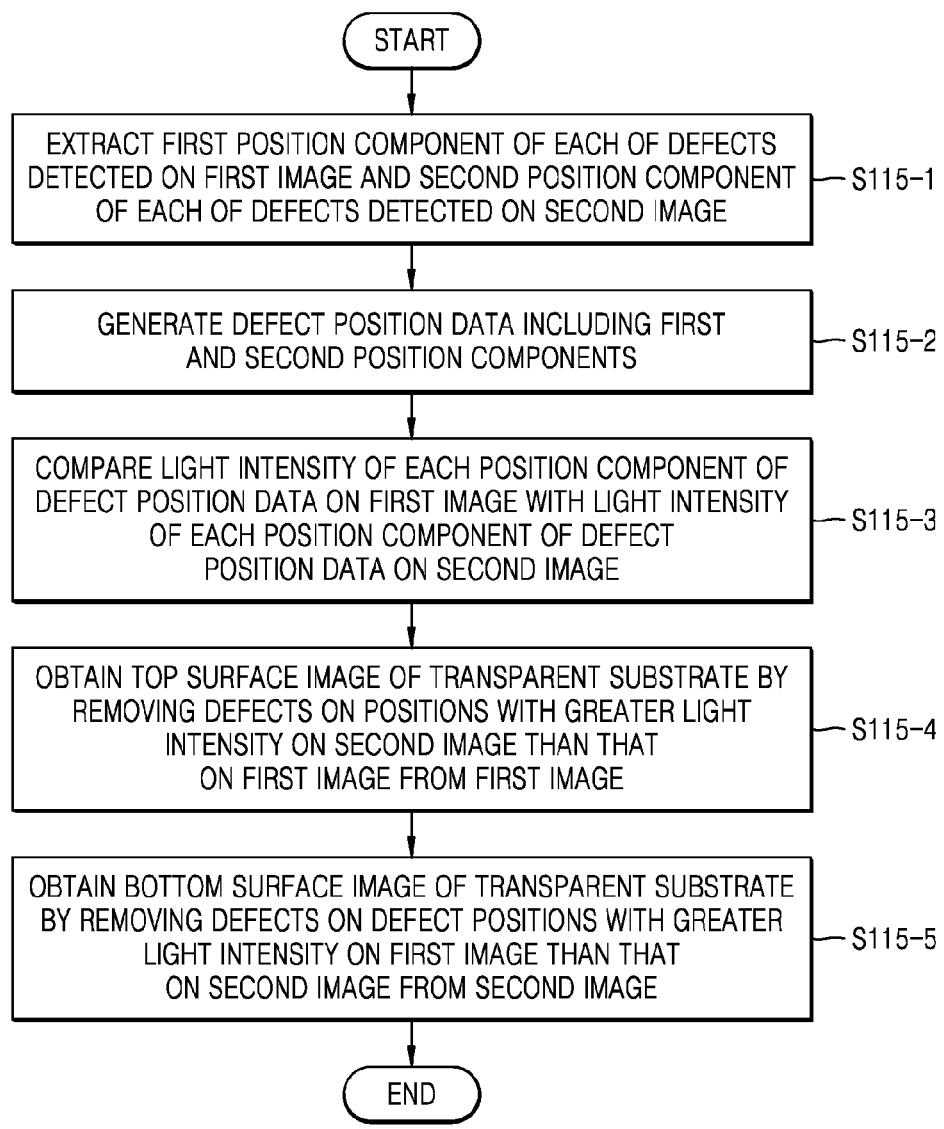
FIG. 4A is a flowchart for explaining an operation of obtaining a first surface image and a second surface image of the transparent substrate by using first and second images and FIGS. 4B to 4E show an embodiment of an operation of obtaining a first surface image and a second surface image, illustrated in FIG. 1A.
Figure 4B:
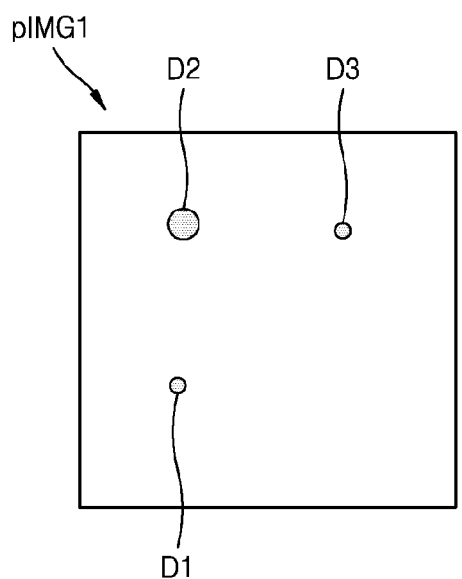
Figure 4C:
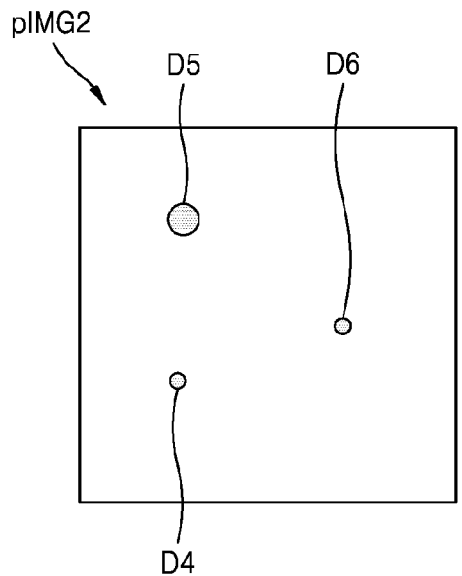
Figure 4D:
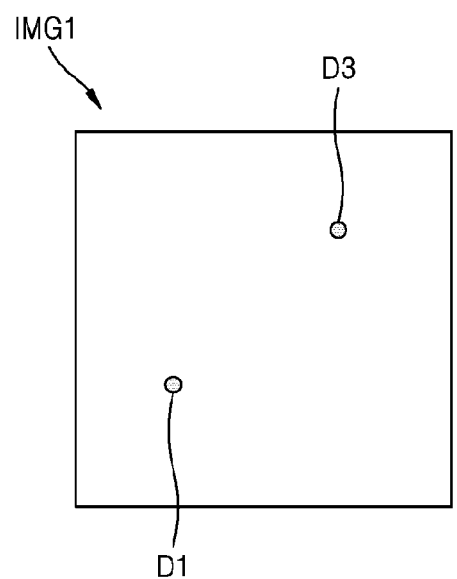
Figure 4E:
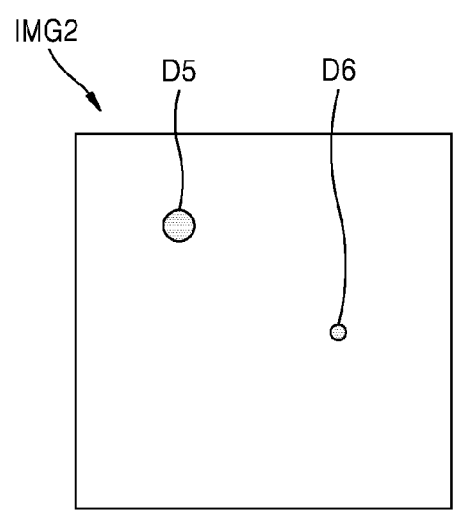

FIG. 2 is a flowchart of a method of detecting defects of the transparent substrate TS according to an embodiment. FIG. 3 is an enlarged view of the portion A, for explaining an operation of selecting a gradient of the illumination optical system 110 and an operation of adjusting positions of the first and second detectors 130a and 130b. FIG. 4A is a flowchart for explaining an operation of obtaining a first surface image and a second surface image of the transparent substrate by using first and second images S115 of FIG. 2. FIGS. 4B to 4E show an embodiment of an operation of obtaining a first surface image and a second surface image, illustrated in FIG. 4A. The method of detecting defects of the transparent substrate TS may use the apparatus 100 for inspecting defects of the transparent substrate TS of FIGS. 1A and 1B. The same elements are denoted by the same reference numerals, and thus a repeated explanation thereof will not be given.

Referring to FIGS. 1A through 3, a first region R1 may be formed when the incident light L emitted from the illumination optical system 110 and incident on the transparent substrate TS meets the first surface $TS_{TS}$ of the transparent substrate TS. A second region R2 may be formed when the transmitted light $L_T$, from among the incident light L, transmitted through the transparent substrate TS meets the second surface $BS_{TS}$ of the transparent substrate TS. In this case, in operation S101, the controller 140 may calculate an incidence angle range of the incident light L so that the first region R1 and the second region R2 do not overlap in the normal direction of the transparent substrate TS.

That is, the controller 140 may calculate a range of the incidence angle $\theta_1$ of the incident light L so that a horizontal separation distance $D_{R1R2}$ between opposite edges of the first region R1 and the second region R2 is greater than 0. Accordingly, the illumination optical system 110 may discriminate and illuminate the particles $P_{TS}$ of the first surface $TS_{TS}$ and the particles $P_{BS}$ of the second surface $BS_{TS}$.

In detail, the incidence angle $\theta_1$ may be selected within an incidence angle range calculated according to Equation 1.

$$D_{R1R2} = T \cdot \tan\left(\sin^{-1}\left(\frac{\sin \theta_1}{n}\right)\right) - \frac{W_L}{\cos \theta_1} \geq 0 \tag{1}$$

where $D_{R1R2}$ is a separation distance between the first region R1 and the second region R2, T is a thickness of the transparent substrate TS, $\theta_1$ is the incidence angle, n is a refractive index of the transparent substrate TS, and $W_L$ is a beam width of the incident light L.

Equation 1 may be derived based on the following conditions: The incident light L, the transmitted light $L_T$, and the reflected light $L_R$ are each parallel light and a refractive index of air to which the incident light L is emitted is 1. The incident light L emitted from the illumination optical system 110 may have a first beam width $W_L$, and then may have a second beam width $W_L'$ on the first region R1 when meeting the transparent substrate TS. In this case, the second beam width $W_L'$ and the first beam width $W_L$ have a relationship of $$W_L' = \frac{w_L}{\cos \theta_s}.$$

The transmitted light $L_T$ may have a third beam width $W_{LT}'$, which is the same as the second beam width $W_L'$, on the second region R2 when meeting the second surface $BS_{TS}$ of the transparent substrate T S.

As such, the controller 140 may calculate an incidence angle range of the incident light L by using Equation 1 so that the first region R1 and the second region R2 do not overlap each other in the normal direction of the transparent substrate TS. The calculating of the incidence angle range may be performed whenever at least one of the thickness T of the transparent substrate TS, a refractive index of the transparent substrate TS, and the first beam width $W_L$ of the incident light is changed.

Next, in operation S103, the incidence angle $\theta_1$ of the incident light L may be selected based on the calculated incidence angle range, and may be adjusted. In this case, the incidence angle $\theta_1$ of the incident light L may be adjusted by rotating the mirror 120.

Next, in operation S105, a position of the first detector 130a may be adjusted so that the first field-of-view FOV1 of the first detector 130a covers the first region R1 and does not cover the second region R2. Likewise, in operation S107, a position of the second detector 130b may be adjusted so that the second field-of-view FOV2 of the second detector 130b covers the second region R2 and does not cover the first region R1.

As described above, the incidence angle $\theta_1$ of the incident light L is adjusted so that the first region R1 and the second region R2 do not overlap in the normal direction of the transparent substrate TS. Accordingly, the first detector 130a that covers only the first region R1 may obtain an image of the first region R1 while minimizing an image of the second region R2. That is, although the second region R2 of the second surface $BS_{TS}$ of the transparent substrate TS is a region to which light is emitted, the second region R2 is not exposed by the first detector 130a. Accordingly, it is difficult for the first detector 130a to obtain an image of the particles $P_{BS}$ on the second region R2. Also, since any light does not reach the particles $P_{BS}$ on regions other than the second region R2 of the second surface $BS_{TS}$ of the transparent substrate TS, it is also difficult for the first detector 130a to obtain an image of the particles $P_{BS}$ on the regions other than the second region R2. Accordingly, the first detector 130a may obtain an image of the particles $P_{TS}$ on the first region R1 while minimizing an image of the particles $P_{BS}$ on the second surface $BS_{TS}$ of the transparent substrate TS.

Likewise, when the first region R1 and the second region R2 do not overlap each other, the second detector 130b may obtain an image of the second region R2 while minimizing an image of the first region R1. That is, the first region R1 on the first surface $TS_{TS}$ of the transparent substrate TS is not exposed by the second detector 130b. Accordingly, it is difficult for the second detector 130b to obtain an image of the particles $P_{TS}$ on the first region R1. Accordingly, the second detector 130b may obtain an image of the particles $P_{BS}$ on the second region R2 while minimizing an image of the particles $P_{TS}$ on the first surface $TS_{TS}$ of the transparent substrate TS.

Figure 5A:
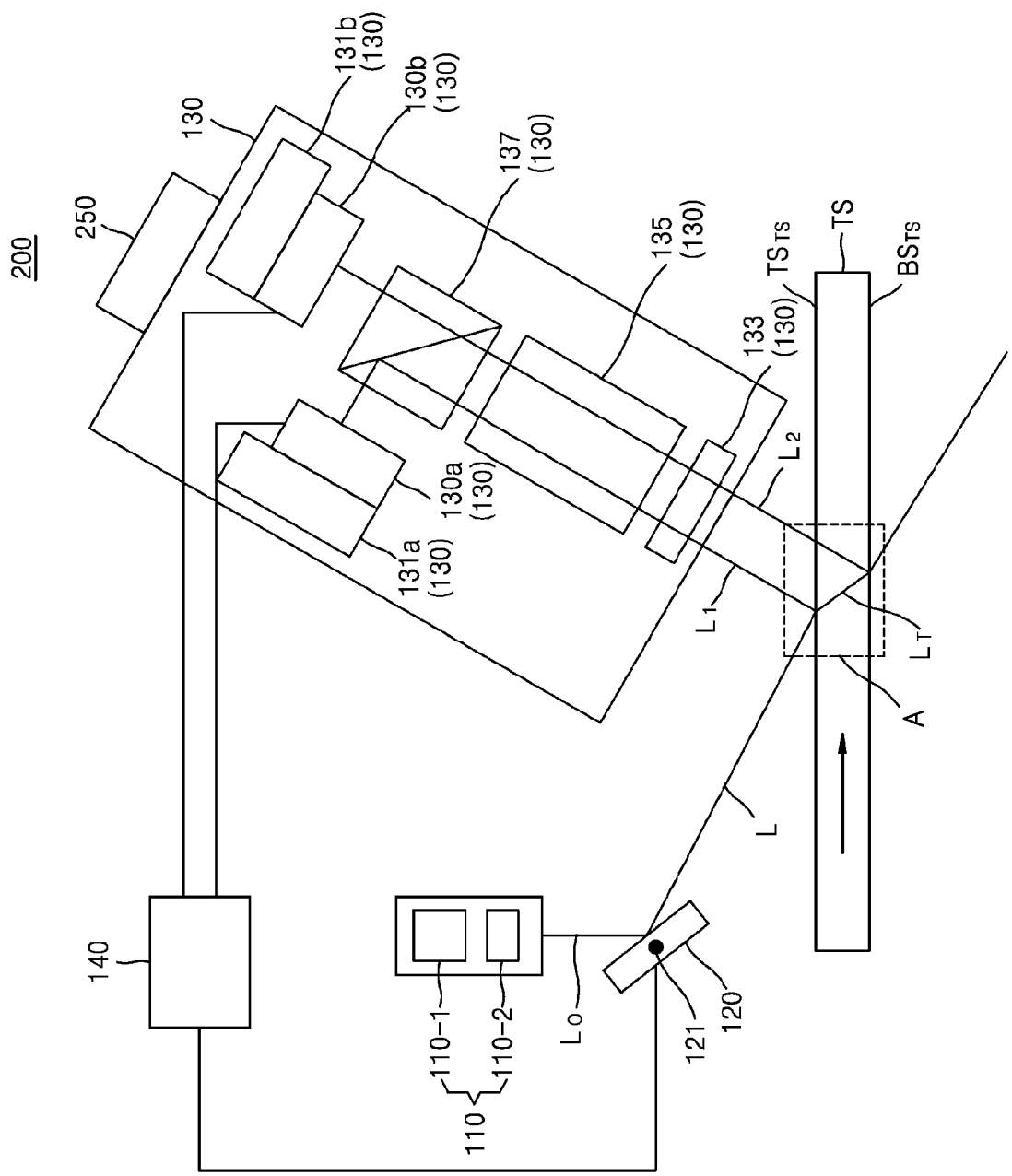
FIG. 5A is a view of an apparatus for inspecting defects of the transparent substrate according to an embodiment.
Figure 5B:
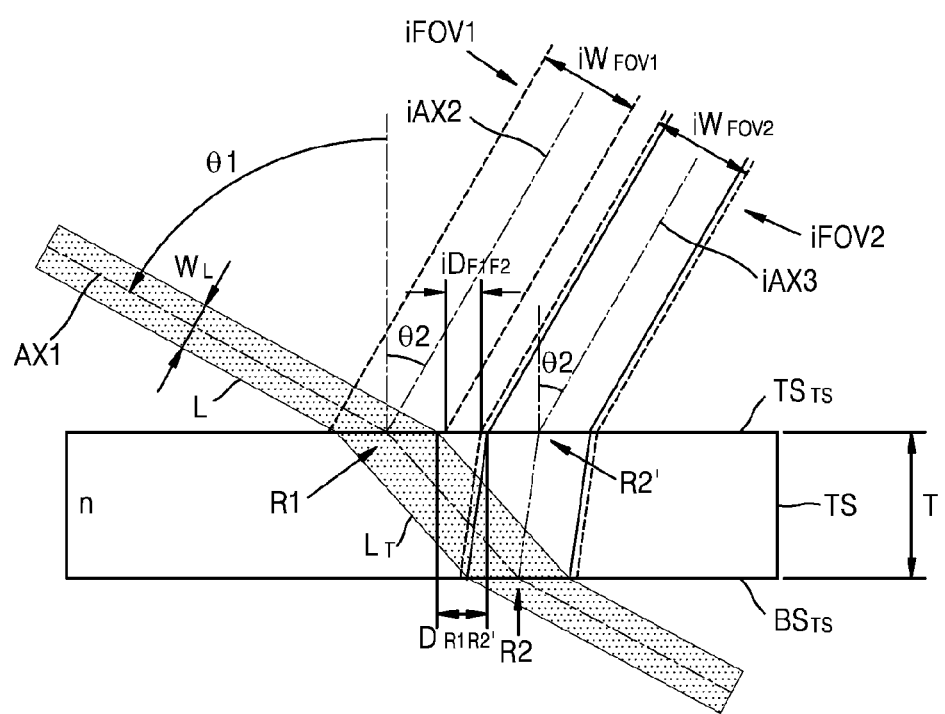
FIG. 5B is an enlarged view of a portion B of FIG. 5A, for explaining an operation of selecting a gradient of the illumination optical system and an operation of adjusting positions of the first and second detectors.

When an apparatus 200 for inspecting defects of FIGS. 5A and 5B is used, operation S104 in which a gradient of the detection optical system 130 is adjusted may be further performed before operations S105 and S107 in which positions of the first and second detectors 130a and 130b are adjusted, which will be explained below in detail with reference to FIGS. 5A and 5B.

Next, in operation S109, a first field-of-view width $W_{FOV1}$ of the first detector 130a and a second field-of-view width $W_{FOV2}$ of the second detector 130b may be adjusted so that the first field-of-view FOV1 and the second field-of-view FOV2 do not overlap each other. In this case, a separation distance between the first field-of-view FOV1 and the second field-of-view FOV2 should be greater than 0 and less than the separation distance $D_{R1R2}$ between the first region R1 and the second region R2.

In an embodiment, the first field-of-view width $W_{FOV1}$ of the first field-of-view FOV1 may be identically matched to a width of the first region R1. The width of the first region R1 is the second beam width $W_L'$ as described above. And the second field-of-view width $W_{FOV2}$ of the second field-of-view FOV2 may be identically matched to a width of the second region R2. The width of the second region R2 is the third beam width $W_{LT}'$ as described above. In this case, the first field-of-view width $W_{FOV1}$ may be matched to the second beam width $W_L'$ and the second field-of-view width $W_{FOV2}$ may be matched to third beam width $W_{LT}'$ by adjusting the first beam width $W_L$ of the illumination optical system 110 or by adjusting the first and second field-of-view widths $W_{FOV1}$ and $W_{FOV2}$ of the first and second detectors 130a and 130b. The incident light L emitted from the illumination optical system 110 may have the first beam width $W_L$ and may have the second beam width $W_L'$ on the first region R1. The transmitted light $L_T$ may have the third beam width $W_{LT}'$, which is substantially the same as the second beam width $W_L'$, on the second region R2.

Noise light other than an image of the first region R1 may be prevented from being introduced into the first detector 130a and the incident light L of the illumination optical system 110 may be prevented from being wasted, by matching the first field-of-view FOV1 and the first region R1. Likewise, noise light other than an image of the second region R2 may be prevented from being introduced into the second detector 130b by matching the second field-of-view FOV2 and the second region R2. Although the second beam width $W_L'$ and the first field-of-view width $W_{FOV1}$, or the third beam width $W_{LT}'$ and the second field-of-view width $W_{FOV2}$ are different from each other in FIG. 3 for convenience of explanation, the second beam width $W_L'$ and the first field-of-view width $W_{FOV1}$ may be substantially the same or the third beam width $W_{LT}'$ and the second field-of-view width $W_{FOV2}$ may be substantially the same.

In operation S111, the illumination optical system 110 and the detection optical system 130 may be set as described above and the transparent substrate TS may be illuminated by using the illumination optical system 110. At the same time, in operation S113, a first image of the first region R1 may be obtained by using the first detector 130a and a second image of the second region R2 may be obtained by using the second detector R2.

Operation S111 in which the transparent substrate TS is illuminated and operation S113 in which the first and second images are obtained may be simultaneously performed while the transparent substrate TS mounted on the stage is moved. Accordingly, defects even on the entire transparent substrate TS may be rapidly inspected.

Next, in operation S115, a first surface image and a second surface image of the transparent substrate TS from which noise is removed by using the first and second images may be obtained. As described above, since the incident light L is incident so that the first and second regions R1 and R2 do not overlap each other and the first and second detectors 130a and 130b respectively cover the first and second regions R1 and R2, the first and second images may reflect the first surface $TS_{TS}$ and the second surface $BS_{TS}$ of the transparent substrate TS with high precision. However, an operation of removing noise by combining the first and second images may be further performed in order to more precisely distinguish an image of the particles $P_{TS}$ on the first surface $TS_{TS}$ from an image of the particles $P_{BS}$ on the second surface $BS_{TS}$.

In detail, referring to FIGS. 4A to 4E, in operation S115-1, first position components P1, P2, and P3 of each of defects D1, D2, and D3 detected on the first image pIMG1 obtained by the first detector 130a and second position components P1, P2, and P4 of each of defects D4, D5, and D6 detected on the second image pIMG2 obtained by the second detector 130b may be extracted. The first position components P1, P2, and P3 may be a set of positions of defects D1, D2, and D3 detected on the first image pIMG1. In addition, the second position components P1, P2, and P4 may be a set of positions of defects D4, D5, and D6 detected on the second image pIMG2. In operation S115-2, defect position data including the first position components P1, P2 and P3 and second position components P1, P2 and P4 may be generated. The defect position data may be a set of position components P1, P2, P3, and P4 of the first position components P1, P2, and P3 and the second position components P1, P2, and P4. Next, in operation S115-3, a light intensity of each position components P1, P2, P3, and P4 of the defect position data on the first image pIMG1 and a light intensity of each position components P1, P2, P3, and P4 of the defect position data on the second image pIMG2 may be compared with each other. According to a result of the comparison, it may be determined whether a real particle detected in defects D1 and D4 on a position component P1 and another real particle detected in defects D2 and D5 on a position component P2 are disposed on the first surface $TS_{TS}$ or the second surface $BS_{TS}$. In operation S115-4, a defect D2 on a position component P2 with a lower light intensity I2 on the first image pIMG1 than a light intensity I5 of a defect D5 on the same position component P2 on the second image pIMG2 may be removed from the first image pIMG1 to obtain a first surface image IMG1 of the transparent substrate TS. A defect D1 on a position component P1 with a greater light intensity I1 on the first image pIMG1 than a light intensity I4 of a defect D4 on the same position component P1 on the second image pIMG2 and a defect D3 on a position component P3 with a light intensity I3 may be maintained in the first image pIMG1. Also, in operation S115-5, a defect D4 on a position component P1 with a lower light intensity I4 on the second image pIMG2 than a light intensity I1 of a defect D1 on the same position component P1 on the first image pIMG1 may be removed from the second image pIMG2 to obtain a second surface image IMG2 of the transparent substrate TS. A defect D5 on a position component P2 with a greater light intensity I5 on the second image pIMG2 than a light intensity I2 of a defect D2 on the same position component P2 on the first image pIMG1 and a defect D6 on a position component P4 with a light intensity I6 may be maintained in the second image pIMG1.

Accordingly, the first surface image IMG1 of the particles $P_{TS}$ on the first surface $TS_{TS}$ and the second surface image IMG2 of the particles $P_{BS}$ on the second surface $BS_{TS}$ of the transparent substrate TS that are more precise than the first and second images pIMG1 and pIMG2 may be obtained.

Although the particles $P_{TS}$ and $P_{BS}$ exist on the first surface $TS_{TS}$ and the second surface $BS_{TS}$ of the transparent substrate TS in FIG. 1B, the method of detecting defects of the transparent substrate TS according to the disclosure may also be used to inspect general defects other than the particles $P_{TS}$ and $P_{BS}$.

FIG. 5A is a view of the apparatus 200 for inspecting defects of the transparent substrate TS according to an embodiment. FIG. 5B is an enlarged view of a portion B of FIG. 5A, for explaining an operation of selecting a gradient of the illumination optical system 110 and an operation of adjusting positions of the first and second detectors 130a and 130b. The apparatus 200 is the same as the apparatus 100 of FIGS. 1A and 1B except that the apparatus 200 further includes an angle adjusting member 250 for adjusting a gradient of the detection optical system 130.

Referring to FIGS. 5A and 5B, the detection optical system 130 of the apparatus 200 may be connected to the angle adjusting member 250. The angle adjusting member 250 may adjust a gradient of the detection optical system 130 so that the detection optical system 130 is inclined at a predetermined angle from the normal direction of the transparent substrate 110.

Accordingly, the detection optical system 130 may be opposite to the illumination optical system 110 with the transparent substrate TS therebetween and may have an optical axis that is inclined at a detection angle $\theta_2$, which is equal to or less than the incidence angle $\theta_1$, from the normal direction of the transparent substrate TS. That is, an optical axis iAX2 of the first detector 130a and an optical axis iAX3 of the second detector 130b may be inclined at the detection angle $\theta_2$ from the normal direction of the transparent substrate TS. In this case, the detection angle $\theta_2$ may be selected to be equal to or less than the incidence angle $\theta_1$. Accordingly, first and second field-of-views iFOV1 and iFOV2 of the first and second detectors 130a and 130b may not overlap reflected light reflected from the second surface $BS_{TS}$ of the transparent substrate TS and emitted at the same angle as the incidence angle $\theta_1$ from the first surface $TS_{TS}$ of the transparent substrate TS. Accordingly, the detection optical system 130 may minimize the influence of noise light due to the reflected light of the second surface $BS_{TS}$.

As described with reference to FIGS. 1A through 3, a position of the first detector 130a is adjusted so that the first field-of-view iFOV1 of the first detector 130a covers the first region R1 and does not cover the second region R2. Likewise, a position of the second detector 130b is adjusted so that the second field-of-view iFOV2 of the second detector 130b covers the second region R2 and does not cover the first region Rt. In detail, a position of at least one of the first and second detectors 130a and 130b may be adjusted according to the following equation.

$$D_{R1R2'} \geq iD_{F1F2} \geq 0$$

where $iD_{F1F2}$ is a separation distance between the first field-of-view iFOV1 and the second field-of-view iFOV2. $D_{R1R2'}$ is a separation distance between the first region R1 and a 2'nd region R2', and the 2'nd region is a region through which the second region R2 is exposed to the first surface $TS_{TS}$ of the transparent substrate TS when the second region R2 is seen at the same angle as the detection angle $\theta_2$. $D_{R1R2'}$ is determined by the following equation.

$$D_{R1R2'} = T \cdot \tan\left(\sin^{-1}\left(\frac{\sin \theta_1}{n}\right)\right) - \frac{W_L}{\cos \theta_1} + T \cdot \tan\left(\sin^{-1}\left(\frac{\sin \theta_2}{n}\right)\right)$$

where T is a thickness of the transparent substrate Ts, $\theta_1$ is the incidence angle, $\theta_2$ is the detection angle, n is a refractive index of the transparent substrate TS, and $W_L$ is a beam width of the incident light L.

In an embodiment, the width of the first field-of-view iFOV1 may be identically matched to the first region R1, and the width of the second field-of-view iFOV2 may be identically matched to the second region R2. In this case, at least one of the first and second field-of-view widths $iW_{FOV1}$ and $iW_{FOV2}$ of the first and second detectors 130a and 130b or the first beam width $W_L$ of the illumination optical system 110 may be adjusted.

The illumination optical system 110 and the detection optical system 130 may be set as described above, the transparent substrate TS may be illuminated by using the illumination optical system 110, a first image of the first region R1 may be obtained by using the first detector 130a, and a second image of the second region R2 may be obtained by using the second detector 130b.

Figure 6:
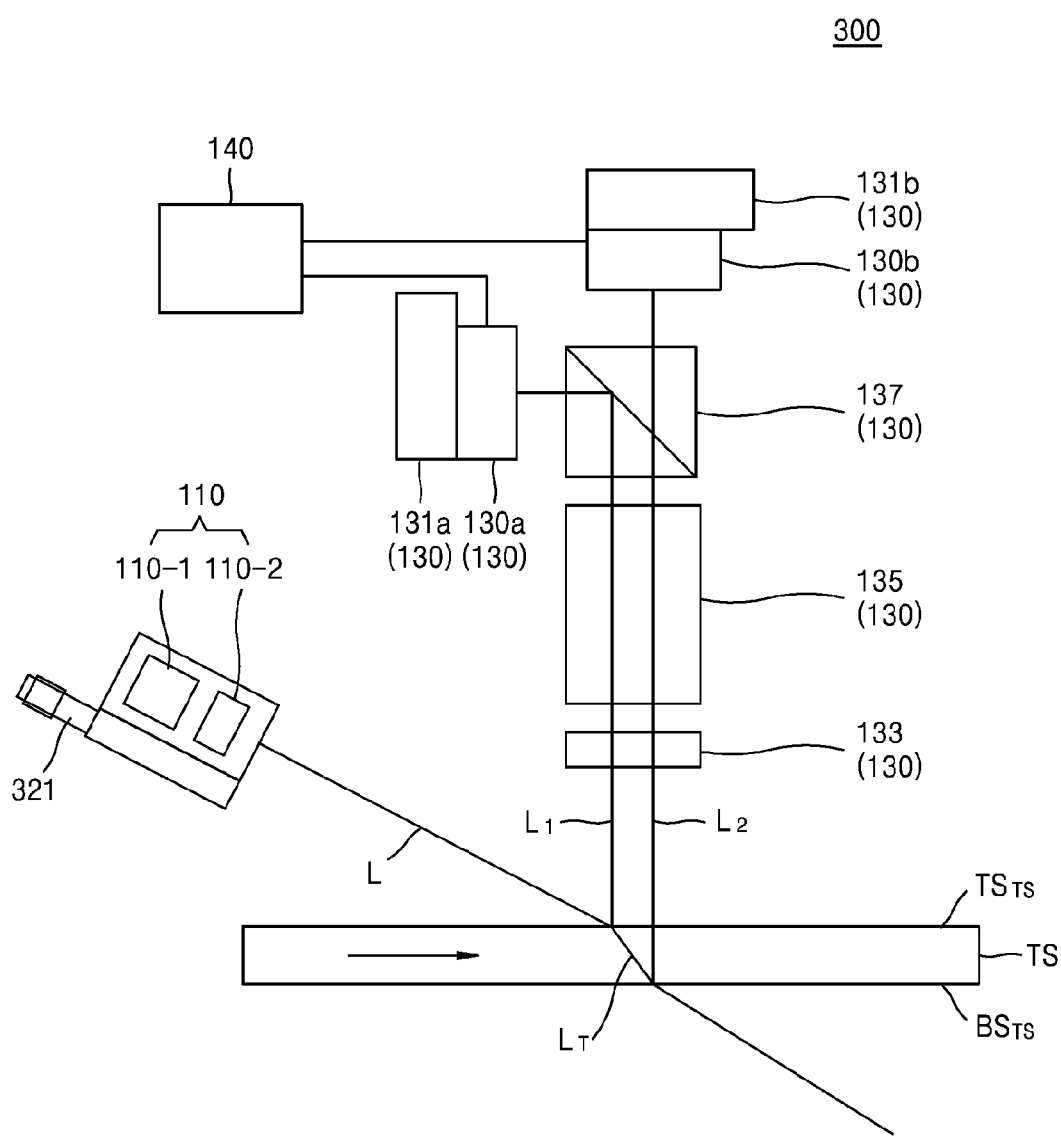
FIG. 6 is a view of an apparatus for inspecting defects of the transparent substrate, according to an embodiment.

FIG. 6 is a view of an apparatus 300 for detecting defects of the transparent substrate TS according to an embodiment. The apparatus 300 is the same as the apparatus 100 of FIGS. 1A and 1B except that the apparatus 300 further includes an angle adjusting member 321 for causing the illumination optical system 110 to be inclined at a predetermined angle in order to adjust an incidence angle of the incident light L incident on the transparent substrate TS. However, the disclosure is not limited thereto, and various other structures may be used to adjust an incidence angle of the incident light L.

According to the disclosure, nanoscale defects existing on a first surface and a second surface of a transparent substrate may be rapidly and accurately discriminated and detected.

While the disclosure has been particularly shown and described with reference to embodiments thereof, they are provided for the purposes of illustration and it will be understood by one of ordinary skill in the art that various modifications and equivalent other embodiments can be made from the disclosure. Accordingly, the true technical scope of the disclosure is defined by the technical spirit of the appended claims.

What is claimed is:

1. A method of inspecting defects of a transparent substrate, the method comprising:
    illuminating the transparent substrate by emitting light from an illumination optical system;
    calculating an incidence angle range of light emitted from the illumination optical system and incident on the transparent substrate so that a first region where the light meets a first surface of the transparent substrate and a second region where light transmitted through the transparent substrate meets a second surface of the transparent substrate do not overlap each other in a direction normal to the transparent substrate, the second surface being opposite to the first surface;
    adjusting an incidence angle of the light according to the calculated incidence angle range;
    adjusting a position of a first detector so that a first field-of-view of the first detector covers the first region and does not cover the second region;
    adjusting a position of a second detector so that a second field-of-view of the second detector covers the second region and does not cover the first region;
    obtaining a first image of the first region from the first detector and obtaining a second image of the second region from the second detector;
    after the obtaining of the first and second images obtaining a first surface image and a second surface image by using the first and second images;
    extracting a first position component of defects detected on the first image and a second position component of defects detected on the second image;
    generating defect position data comprising the first and second position components;
    comparing a light intensity of each position component of the defect position data on the first image with a light intensity of each position component of the defect position data on the second image; and
    obtaining the first surface image of the transparent substrate by removing, from the first image, defects on positions with a greater light intensity on the second image than a light intensity on the first image.

2. The method of claim 1, wherein calculating the incidence angle range comprises determining a horizontal separation distance between opposite edges of the first region and the second region.

3. The method of claim 2, wherein calculating the incidence angle range comprises utilizing the equation:

$$D_{R1R2} = T \cdot \tan\left(\sin^{-1}\left(\frac{\sin \theta_1}{n}\right)\right) - \frac{W_L}{\cos \theta_1} \geq 0$$

where $D_{R1R2}$ is a separation distance between the first region and the second region, T is a thickness of the transparent substrate, $\theta_1$ is the incidence angle, n is a refractive index of the transparent substrate, and $W_1$ is a beam width of the incident light.

4. The method of claim 1, further comprising adjusting a field-of-view width of the first detector and a field-of-view width of the second detector so that the first field-of-view and the second field-of-view do not overlap each other.

5. The method of claim 1, further comprising adjusting at least one of a beam width of the illumination optical system and field-of-view widths of the first and second detectors so that the widths of the first field-of-view and the first region are matched to each other and the widths of the second field-of-view and the second region are matched to each other.

6. The method of claim 1, further comprising moving the transparent substrate mounted on a stage,
wherein the illuminating of the transparent substrate and the obtaining of the first and second images are simultaneously performed while the transparent substrate is moved.

7. The method of claim 1, further comprising obtaining the second surface image of the transparent substrate by removing, from the second image, defects on positions with a greater light intensity on the first image than a light intensity on the second image.

8. The method of claim 1, further comprising, after the adjusting of the incidence angle of the incident light, adjusting a gradient of a detection optical system comprising the first detector and the second detector so that each of optical axes of the first and second detectors has a detection angle that is equal to or less than the incidence angle.

9. The method of claim 8, wherein a position of at least one of the first and second detectors is adjusted according to the following equation:

$$D_{R1R2'} \geq D_{F1F2} \geq 0$$

where $D_{F1F2}$n is a separation distance between the first field-of-view and the second field-of-view, $D_{R1R2'}$ is a separation distance between the first region and a 2'nd region, the 2'nd region is a region through which the second region is exposed to the first surface of the transparent substrate when the second region is seen at the detection angle, and $D_{R1R2'}$ is determined by the following equation:

$$D_{R1R2'} = T \cdot \tan\left(\sin^{-1}\left(\frac{\sin \theta_1}{n}\right)\right) - \frac{W_L}{\cos \theta_1} + T \cdot \tan\left(\sin^{-1}\left(\frac{\sin \theta_2}{n}\right)\right)$$

where T is a thickness of the transparent substrate, 1 is the incidence angle, 02 is the detection angle, n is a refractive index of the transparent substrate, and $W_L$ is a beam width of the incident light.

10. A method of inspecting defects of a transparent substrate, the method comprising:
illuminating the transparent substrate by emitting light from an illumination optical system;
calculating an incidence angle range of light emitted from the illumination optical system and incident on the transparent substrate so that a first region where the light meets a first surface of the transparent substrate and a second region where light transmitted through the transparent substrate meets a second surface of the transparent substrate do not overlap each other in a direction normal to the transparent substrate, the second surface being opposite to the first surface;
adjusting an incidence angle of the light according to the calculated incidence angle range;
adjusting a position of a first detector so that a first field-of-view of the first detector covers the first region and does not cover the second region;
adjusting a position of a second detector so that a second field-of-view of the second detector covers the second region and does not cover the first region;
obtaining a first image of the first region from the first detector and obtaining a second image of the second region from the second detector; and
after the adjusting of the incidence angle of the incident light, adjusting a gradient of a detection optical system comprising the first detector and the second detector so that each of optical axes of the first and second detectors has a detection angle that is equal to or less than the incidence angle,
wherein a position of at least one of the first and second detectors is adjusted according to the following equation:

$$D_{R1R2'} \geq D_{F1F2} \geq 0$$

where $D_{F1F2}$ is a separation distance between the first field-of-view and the second field-of-view, $D_{R1R2'}$ is a separation distance between the first region and a 2'nd region, the 2'nd region is a region through which the second region is exposed to the first surface of the transparent substrate when the second region is seen at the detection angle, and $D_{R1R2'}$ is determined by the following equation:

$$D_{R1R2'} = T \cdot \tan\left(\sin^{-1}\left(\frac{\sin \theta_1}{n}\right)\right) - \frac{W_L}{\cos \theta_1} + T \cdot \tan\left(\sin^{-1}\left(\frac{\sin \theta_2}{n}\right)\right)$$

where T is a thickness of the transparent substrate, $\theta_1$ is the incidence angle, $\theta_2$ is the detection angle, n is a refractive index of the transparent substrate, and $W_L$ is a beam width of the incident light.

11. The method of claim 10, wherein calculating the incidence angle range comprises determining a horizontal separation distance between opposite edges of the first region and the second region.

12. The method of claim 10, further comprising adjusting a field-of-view width of the first detector and a field-of-view width of the second detector so that the first field-of-view and the second field-of-view do not overlap each other.

13. The method of claim 10, further comprising adjusting at least one of a beam width of the illumination optical system and field-of-view widths of the first and second detectors so that the widths of the first field-of-view and the first region are matched to each other and the widths of the second field-of-view and the second region are matched to each other.

14. The method of claim 10, further comprising moving the transparent substrate mounted on a stage,
wherein the illuminating of the transparent substrate and the obtaining of the first and second images are simultaneously performed while the transparent substrate is moved.

* * * * *

UNITED STATES PATENT AND TRADEMARK OFFICE
CERTIFICATE OF CORRECTION

PATENT NO. : 10,677,739 B2  Page 1 of 1
APPLICATION NO. : 16/346704
DATED : June 9, 2020
INVENTOR(S) : Uta-Barbara Goers et al.

It is certified that error appears in the above-identified patent and that said Letters Patent is hereby corrected as shown below:

On the Title Page

Item (72), Inventors, Line 3, delete "Cheonal-si" and insert -- Cheonan-si --, therefor.

In the Claims

In Column 14, Line 31, Claim 1, delete "images" and insert -- images, --, therefor.

In Column 14, Line 62, Claim 3, delete "$W_1$" and insert -- $W_L$ --, therefor.

In Column 15, Line 29 (approx.), Claim 9, delete "$D_{R1R2} \geq D_{F1F2} \geq \geq 0$" and insert -- $D_{R1R2'} \geq D_{F1F2} \geq 0$ --, therefor.

In Column 15, Line 30 (approx.), Claim 9, delete "$D_{F1F2}n$" and insert -- $D_{F1F2}$ --, therefor.

In Column 15, Line 44 (approx.), Claim 9, delete "1" and insert -- $\theta_1$ --, therefor.

In Column 15, Line 45 (approx.), Claim 9, delete "02" and insert -- $\theta_2$ --, therefor.

Signed and Sealed this
Tenth Day of January, 2023

Katherine Kelly Vidal
*Director of the United States Patent and Trademark Office*